(12) United States Patent
Akin et al.

(10) Patent No.: US 10,891,070 B1
(45) Date of Patent: Jan. 12, 2021

(54) MANAGING GARBAGE COLLECTION IN A MEMORY SUBSYSTEM BASED ON CHARACTERISTICS OF DATA STREAMS

(71) Applicant: Micron Technology, Inc., Boise, ID (US)

(72) Inventors: William Akin, Morgan Hill, CA (US); Shirish D. Bahirat, Longmont, CO (US)

(73) Assignee: MICRON TECHNOLOGY, INC., Boise, ID (US)

( * ) Notice: Subject to any disclaimer, the term of this patent is extended or adjusted under 35 U.S.C. 154(b) by 7 days.

(21) Appl. No.: 16/514,234

(22) Filed: Jul. 17, 2019

(51) Int. Cl.
*G06F 12/00* (2006.01)
*G06F 3/06* (2006.01)
*G06F 12/02* (2006.01)

(52) U.S. Cl.
CPC .......... *G06F 3/0652* (2013.01); *G06F 3/0604* (2013.01); *G06F 3/064* (2013.01); *G06F 3/0659* (2013.01); *G06F 3/0673* (2013.01); *G06F 12/0246* (2013.01); *G06F 12/0253* (2013.01); *G06F 2212/7205* (2013.01)

(58) Field of Classification Search
CPC ...... G06F 3/0652; G06F 3/0604; G06F 3/064; G06F 3/0659; G06F 12/0238; G06F 12/0246; G06F 12/0253; G06F 2212/7205
See application file for complete search history.

(56) References Cited

U.S. PATENT DOCUMENTS 8,438,362 B2 * 5/2013 Mukherjee .......... G06F 12/0253
711/170

* cited by examiner

*Primary Examiner* — Shawn X Gu
(74) *Attorney, Agent, or Firm* — Nicholson De Vos Webster & Elliott LLP

(57) ABSTRACT

A method for managing garbage collection in a memory subsystem, where a stream data manager writes data units from a stream of data into an allocated portion of memory composed of a plurality of blocks. The stream data manager evaluates a behavior of the stream of data to calculate the stream's efficiency, the behavior including amounts of valid data units from the stream of data in the allocated portion of memory. The stream data manager estimates a number of block stripe fills until an amount of valid data units is predicted to be within a predetermined range of a threshold value of valid data units in the block using the evaluated behavior. The stream data manager performs the estimated number of block stripe fills. The stream data manager performs the garbage collection of a first block of the plurality of blocks in response to performance of the estimated number of block stripe fills.

20 Claims, 5 Drawing Sheets

MANAGING GARBAGE COLLECTION IN A MEMORY SUBSYSTEM BASED ON CHARACTERISTICS OF DATA STREAMS

TECHNICAL FIELD

The present disclosure relates to memory subsystems, and more specifically, relates to managing garbage collection of data in a memory subsystem based on characteristics of data streams.

BACKGROUND ART

A memory subsystem can be a storage system, such as a solid-state drive (SSD), and can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
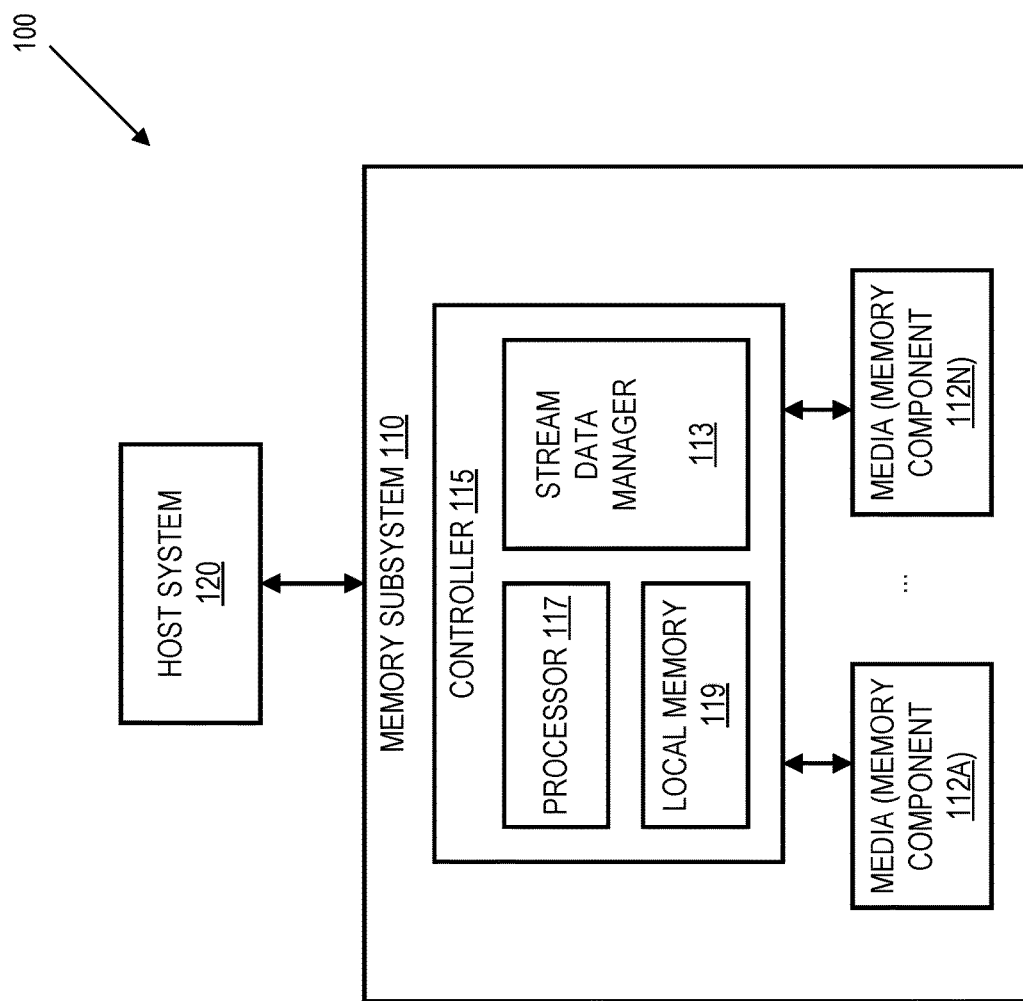
FIG. 1 illustrates an example computing environment that includes a memory subsystem in accordance with some embodiments of the present disclosure.

Aspects of the present disclosure are directed to a stream data manager in a memory subsystem. A memory subsystem is also hereinafter referred to as a "memory device". An example of a memory subsystem is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory subsystem is a storage device that is connected to the central processing unit (CPU) via a peripheral interconnect (e.g., an input/output bus, a storage area network, etc.). Examples of storage devices include a solid-state drive (SSD), a flash drive, a universal serial bus (USB) flash drive, and a hard disk drive (HDD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

Memory subsystems receive data from host systems to write to memory, including to non-volatile memory (e.g., a NAND flash memory). Flash memory is subdivided into blocks composed of writeable units, such as pages. Pages typically cannot be overwritten. Instead, to free up blocks, memory subsystems perform a garbage collection process that includes erasing all the data in a block. Prior to erasing the data in a block, memory subsystems copy any valid from the block to be erased and write the valid data to a new block. In some memory subsystems, the blocks with the lowest amounts of valid data are prioritized for garbage collection, as they involve copying and rewriting the least amount of data. Such an approach, however, can result in blocks with higher amounts of valid data being selected for garbage collection infrequently. This can result in wasted resources as blocks in memory that have low amounts of invalid data are ignored or are low priority for garbage collection, despite having memory space that can be erased and used for future write operations.

Some memory subsystems store data from multiple sources (e.g., applications, virtual machines, etc.) in a single region of non-volatile memory. Data from different sources, however, can exhibit different behaviors. For example, data from a first source (e.g., a stock price) is modified frequently and has a high rate of invalidity and data from a second source (e.g., a movie file) is modified infrequently and has a low rate of invalidity. Writing data with highly disparate rates of invalidity to the same block complicates garbage collection as more overhead is required to move more valid data.

Aspects of the present disclosure provide efficiencies in the process of garbage collection of blocks in memory by identifying characteristics of the data in each stream of data and determining efficient means of performing garbage collection processes based on the identified characteristics. For example, a processing system receives multiples streams of data from a host system and determines stream efficiency values for each stream based on the number of data units invalidated after being written into memory. The processing system can receive a separate data stream for different sources. Data units written to memory are invalidated when the same data units are subsequently written to the memory. Using the stream efficiency values for streams of data being written to memory, the processing system can determine garbage collection thresholds for different portions of memory associated with the different streams and blend the garbage collection of streams of data with similar stream efficiency values. In addition, evaluating and analyzing the behavior of a stream of data allows the processing system to estimate when to perform garbage collection of blocks storing data units from the stream of data. Using the evaluated behavior of streams of data and calculated stream efficiency values as part of the garbage collection process provides improvements in the use of resources that are needed to perform garbage collection. For example, by identifying the valid data unit counts for various streams to identify the streams that invalidate faster, the processing system can select which streams to garbage collect first and/or perform blended garbage collection. This can result in lower the write amplification and improve overall cycling and performance by not moving content that will get invalidated quickly.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is a SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes a stream data manager 113 that can manage how data in different streams of data are stored, including the allocation of portions of a memory component (e.g., memory component 112A-112N) for data storage. In some embodiments, the controller 115 includes at least a portion of the stream data manager 113. For example, the controller 115 can include a processor 117 (processing device) configured to execute instructions stored in local memory 119 for performing the operations described herein. In some embodiments, the stream data manager 113 is part of the host system 110, an application, or an operating system.

In one embodiment, the memory subsystem 110 receives data from various sources, including operating systems, virtual machines, and applications. The memory subsystem 110 can receive a separate stream of data for each source, combined streams composed of data units from multiple sources, or a combination of separate and combined streams. Each stream can exhibit different behaviors because of the different sources of the data units.

The stream data manager 113 can analyze different streams of data to determine characteristics of the different streams of data. In such embodiments, the stream data manager 113 utilizes the stream characteristics to determine the invalidity efficiencies of the different streams of data, and efficient garbage collection of the portions of the memory component allocated to each of the streams of data. The stream data manager 113 can also evaluate the behavior of streams of data. In one embodiment, the stream data manager 113 determines how and at what rate data units written to memory from a stream of data are invalidating. In such embodiments, the stream data manager 113 calculates anticipated invalidity behavior of the stream of data to determine an estimated time for performance of garbage collection. Further details regarding the operations of the stream data manager 113 are described below.

In one embodiment, the stream data manager 113 logically divides a memory component 112 into a plurality of superblocks for storage of data units from one or more streams of data. In one embodiment, each superblock is composed of one or more blocks, each block having a plurality of pages. In one embodiment, 4-8 MB of data can be written to a single block, and 8-16 KB of data can be written to each page within a block. In one embodiment, the stream data manager 113 writes data to pages or portions of pages within a block until all the pages within the block have been written, and then continues writing to pages in the next available or queued empty block in the superblock.

In one embodiment, the host system 120 sends data to the memory subsystem 110 for storage onto designated superblocks, where a set of superblocks is dedicated for storage of data from a stream of data. For example, the memory subsystem 110 writes data at the page level to pages in a first superblock composed of a first set of blocks for a first stream of data, and to pages in a second superblock composed of a second set of blocks for a second stream of data.

In one embodiment, the controller 115 cannot overwrite pages within a block with new or updated data. In such embodiments, the controller 115 can mark, or otherwise designate, data as invalid (to be deleted/updated as a part of a garbage collection process) and valid (to be copied to a new block when deleting invalid data). After the valid data within the block has been copied to the new block, the controller 155 can erase the contents of the original block so that the original block can be usable for writing new data.

A. Performing Garbage Collection of Data Based on a Stream Efficiency Value

In one embodiment, the process of storing data associated with multiple streams in storage structures includes the memory subsystem 110 receiving data, e.g., from the host system 120. The data can include a combination of data units from multiple data streams. In one embodiment, each data unit is 4 KB in size. The data units can be referred to as translation units (TUs) or logical block addresses (LBAs).

The different data streams can be associated with a stream identifier to differentiate data units that have been assigned to different streams. In one embodiment, the host system 120 assigns a stream identifier to data units and the stream data manager 113 determines the stream identifier sent with the data. In some embodiments, the stream data manager 113 utilizes the stream identifier to identify the appropriate superblock for storage of the data in the identified data stream.

In other embodiments, the stream data manager 113 does not receive a stream identifier from the host system 120. In such embodiments, the stream data manager 113 assigns a stream identifier to received data units. In one embodiment, the stream data manager 113 assigns data units to a specific stream from the multiple streams based on various factors, including data source, characteristics of the data, etc. For example, the stream data manager 113 can assign stream identifiers based on the behavior of the stream of data, including how frequently data from a stream is invalidated.

In some embodiments, the stream data manager 113 assigns portions of memory (e.g., memory component 112A) to which to write the data from the stream based on the identified behaviors. For example, the stream data manager 113 can group streams of data with similar rates of invalidation and assign a stream identifier to the grouped streams of data.

In one embodiment, as the memory subsystem 110 receives subsequent data from the data streams associated with superblocks, the subsequent data can include requests to the memory subsystem 110 that invalidate data units already stored in blocks within a superblock. For example, the host system 120 can cause the invalidation of previously stored data units by deleting or rewriting the data units.

In one embodiment, the stream data manager 113 monitors and evaluates the behavior of the data streams, including tracking a number of data units invalidated by host rewrites. In one embodiment, the stream data manager 113 monitors an amount of data units invalidated as a percentage of the total number of data units at a given time. In one embodiment, the stream data manager 113 calculates a stream efficiency value for a particular stream based on the evaluation of the behavior of the particular stream, expressed as:

$$\text{Stream Efficiency Value} = \frac{\text{Data Units Invalidated by Host Writes For a Stream}}{\text{Total Number of Data Units For the Stream}}$$

In one embodiment, a higher stream efficiency value for a block indicates that the host device invalidates a larger percentage of data units within the block (e.g., a hot stream), and a lower stream efficiency value for a block indicates that the host device invalidates a smaller percentage of data units within the block (e.g., a cold stream). In one example, the stream data manager 113 writes 100 data units from a first stream to a first block and 80 data units are subsequently invalidated, and the stream data manager 113 writes 200 data units from a second stream to a second block and 100 data units are subsequently invalidated. Using the above equation, the stream data manager 113 determines that the first and second streams have stream efficiency value of 0.8 (or 80%) and 0.5 (or 50%), respectively. The closer the stream efficiency value for a block gets to a value of 1, the fewer valid data units the block has. Accordingly, the stream data manager 113 performs fewer copy operations to move the valid data units from the block to a new block in the superblock during a garbage collection process. Conversely, the closer the stream efficiency value for a block gets to a value of 0, the more valid data units the block has, and the stream data manager 113 performs a greater number of copy operations to move the valid data units from the block to a new block in the superblock during a garbage collection process.

In one embodiment, the stream data manager 113 calculates the stream efficiency value for a block, or series of blocks, after new data units are written to the block. In other embodiments, the stream data manager 113 calculates the stream efficiency value for a block, or series of blocks, after preestablished intervals or based on a percentage of the remaining available storage in a block.

In one embodiment, the stream data manager 113 compares the stream efficiency values of two or more streams of data to identify streams of data with similar stream efficiency values. For example, the stream data manager 113 identifies two streams as having similar stream efficiency values when a first stream efficiency value for a first stream of data is within a predetermined range of a second stream efficiency value for a second stream of data. In one embodiment, the stream data manager 113 compares the stream efficiency values of two or more streams of data having, or within a range of, the same number of data units. In one embodiment, in response to identifying that two streams have similar stream efficiency values, the stream data manager 113 blends the garbage collection of one or more first blocks associated with the first stream of data and one or more second blocks associated with the second stream of data. In such embodiments, blending the garbage collection of data units from different portions of memory associated with different streams of data improves system performance by reducing the amount of processing and system resources required to perform garbage collection. For example, selecting to garbage collect from streams of data with lower stream efficiency values, or invalidation rates, lowers the write amplification because streams of data with higher stream efficiency values will invalidate more of its contents, ultimately requiring less or no garbage collection.

In one embodiment, after determining stream efficiency value for streams, the stream data manager 113 can bucketize the data units from the streams into smaller sets of data units. In such embodiment, the stream data manager 113 identifies a first stream efficiency value for a first set of data units of the stream of data and a second efficiency value for a second set of data units of the stream of data. The stream data manager 113 compares the first stream efficiency value against the second stream efficiency value to determine whether the different sets of data units are invalidating at different rates. In one embodiment, the stream data manager 113 identifies the stream efficiency values for different sets of data units for multiple streams. In such embodiments, the stream data manager 113 identifies sets of data units having similar behaviors (e.g., same or similar stream efficiency values). In one embodiment, the stream data manager 113, upon identifying sets of data units having similar behaviors, blends the garbage collection of the identified sets of data units. For example, the stream data manager 113 blends the garbage collection of one or more sets of data units from a first stream with one or more sets of data units from a second stream.

In one embodiment, the stream data manager 113 establishes a garbage collection threshold for blocks within a superblock. For example, the garbage collection threshold can be satisfied when a predetermined number of data units/blocks within the superblock are invalid or, conversely, when only a predetermined number of valid data units/blocks remain in the superblock. In one embodiment, the stream data manager 113 establishes different thresholds for different superblocks, based in part on the stream efficiency values for the different streams of data assigned to the different superblocks. For example, a "cold stream" that has a high amount of valid data units and/or does not self-invalidate quickly can be associated with a cold stream garbage collection threshold, while a "hot stream" that has a low amount of valid data units and/or self-invalidates quickly can be associated with a hot stream garbage collection threshold. In one embodiment, the cold stream garbage collection threshold requires fewer invalid data units/blocks to be satisfied than the hot stream garbage collection threshold. In other embodiments, the stream data manager 113 establishes a single garbage collection threshold for blocks in multiple superblocks for different streams of data.

In some embodiments, the stream data manager 113 writes data to a block until the block is full, and subsequently continues to a next block in the same superblock. In one embodiment, the stream data manager 113 monitors blocks, including full blocks, to determine an amount of valid/invalid data units in each block. The stream data manager 113 periodically determines a percentage of all the data units in each block that are valid. When the percentage of all the data units in a block that are valid in within a range, matches, or exceeds a threshold value, the stream data manager 113 triggers a garbage collection process for the block. For example, if a garbage collection threshold for a set of blocks is set to 70% valid, the stream data manager 113 initiates garbage collection for a block when the amount of valid data units in the block is within a range of or reaches 70% valid.

In one embodiment, after the garbage collection process is triggered for a particular block, the stream data manager 113 determines or otherwise identifies the valid data units in the block. The stream data manager 113 copies the valid data units written in the block to a new block within the superblocks and does not copy invalidated data units to the new block. In one embodiment, the stream data manager 113 identifies an empty block within the superblock or accesses a queue of empty blocks designated for the superblock. In some embodiments, the stream data manager 113 copies the valid data units to another block containing valid data units from a previous garbage collection and/or newly written data units. After copying the valid data units to the new block, the stream data manager 113 erases all the data units written in the garbage collected block.

Figure 2:
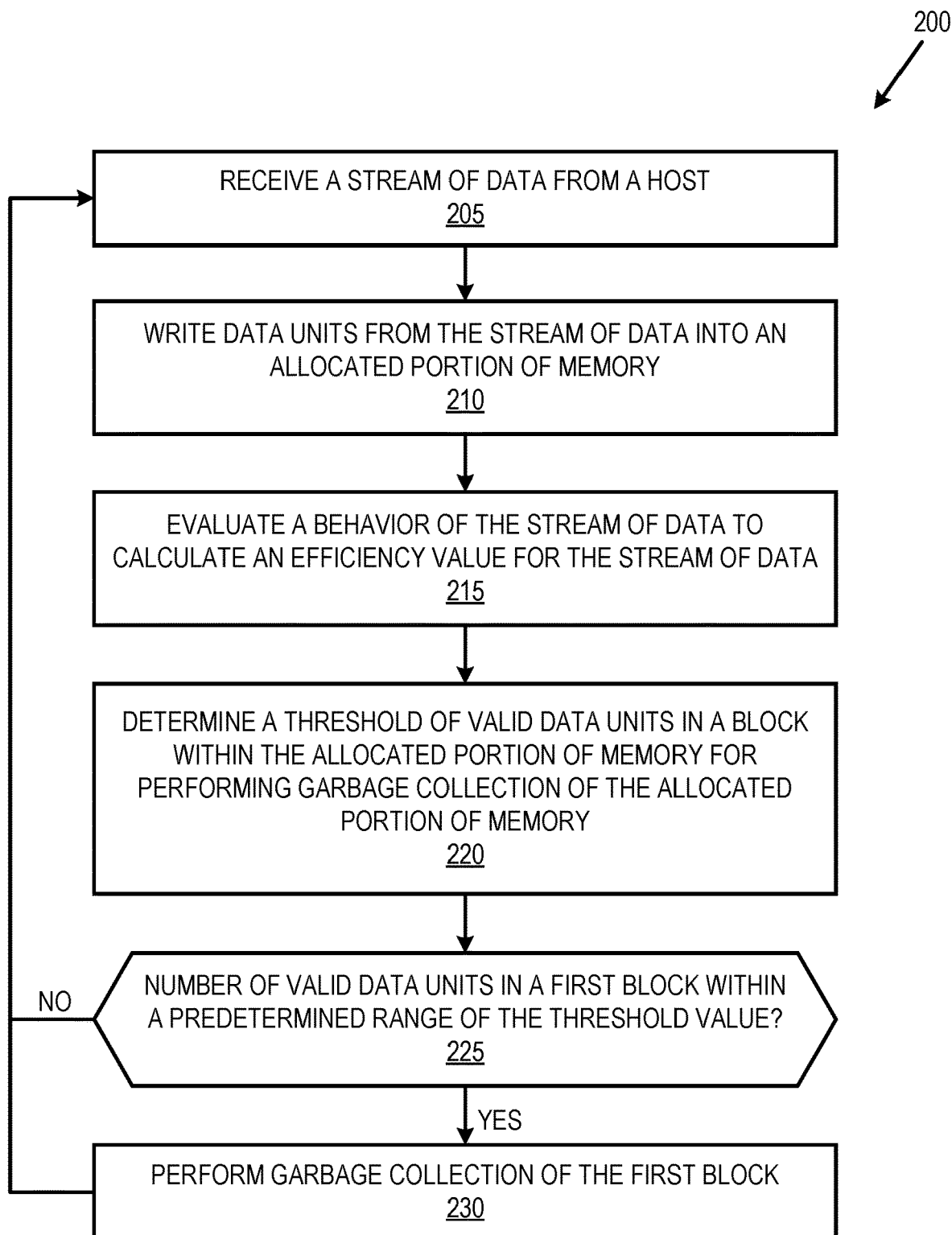
FIG. 2 is a flow diagram of an example method to evaluate blocks in memory to perform a garbage collection process, in accordance with some embodiments of the present disclosure.

FIG. 2 is a flow diagram of an example method to evaluate blocks in memory to perform a garbage collection process, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the stream data manager 113 of FIG. 1 or one or more subcomponents of the stream data manager 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing device receives a stream of data from a host (e.g., host system 120). In one embodiment, the stream of data is composed of data units to be written to a non-volatile memory (e.g., NAND). In one embodiment, each data unit is up to 4 KB in size. The data units can be referred to as translation units (TUs) or logical block addresses (LBAs).

In one embodiment, the processing device receives the stream of data and determines or accesses a stream identifier associated with the stream of data. In one embodiment, host system 120 assigns the stream identifier to the stream of data, and the processing device reads the stream identifier when receiving data units from the stream of data. In other embodiments, the processing device assigns a stream identifier to the stream of data (e.g., based on one or more of previous characteristics/behaviors of the stream of data, the source of the stream of data, etc.). The processing device allocates a portion of memory to write data units from the stream of data, where the processing device identifies that allocated portion of the memory using the stream identifier.

At operation 210, the processing device writes the data units from the stream of data into the allocated portion of memory associated with the stream identifier. In one embodiment, the processing device determines or locates a stream identifier associated with the stream of data. In such embodiments, the stream identifier differentiates data units from different streams and identifies the appropriate superblock for storage of the data units from the received stream of data. In one embodiment, the processing device identifies the location within a block where a previous write operation ended and writes the data units to unwritten the first unwritten page (or unwritten portion of a page within the block).

At operation 215, the processing device evaluates a behavior of the stream of data to calculate a stream efficiency value for the stream of data. In one embodiment, the processing device calculates a stream efficiency value by monitoring data units written to one or more blocks in a superblock and tracking the invalidation of the data units in the blocks. In one embodiment, the processing device calculates the stream efficiency value for a particular stream of data by calculating the quotient of the number of data units invalidated by writes for the stream divided by the total number of data units written for the stream, e.g., as described above. For example, the processing device can maintain a data structure mapping each stream to data units written for that stream and data units invalidated for that stream for a given period.

At operation 220, the processing device determines a threshold for performing garbage collection of the allocated portion of memory. In one embodiment, the processing device determines the garbage collection threshold as a number of valid data units in a block within an allocated portion of memory. In one embodiment, the garbage collection threshold is a percentage of valid data units in a block. For example, for a superblock with blocks having a calculated stream efficiency value of 0.80 (e.g., a "hot stream"), the processing device sets a threshold at 20% valid data because the high stream efficiency value indicates that the blocks will self-invalidate quickly. In another example, for a superblocks with blocks having a calculated stream efficiency value of 0.10 (e.g., a "cold stream"), the processing device sets a threshold at 60% valid data because the low stream efficiency value indicates that the blocks will self-invalidate slowly. In one embodiment, the garbage collection threshold is applicable to all blocks within a superblock allocated to a particular stream of data. For example, determining a threshold for performing garbage collection can include selecting a cold stream garbage collection threshold for a portion of memory associated with a cold stream and a hot stream garbage collection threshold for a portion of memory associated with a hot stream.

At operation 225, the processing device determines if the number of valid data units in a block is within range of, has reached, or has exceeded the garbage collection threshold. In one embodiment, the processing device monitors the number of valid data units as the number of valid data units declines due to subsequent data units or requests from the host invalidating data units. When the number of valid data units in a block falls within a preestablished range of the garbage collection threshold, the flow proceeds to operation 230. When the number of valid data units is not within the preestablished range of the garbage collection threshold, the flow returns to operation 205 and the processing device receives and stores additional data units from the stream of data. In embodiments, the processing device determines if the number of valid data units for each block within the superblock is within range of, has reached, or has exceeded the garbage collection threshold for each block within the superblock.

At operation 230, the processing device performs garbage collection in response to determining that the amount of written space within a block is within range of or exceeds a threshold value. In some embodiments, while the processing device performs the garbage collection process, the flow returns to operation 205 and the processing device receives and stores additional data units from the stream of data.

In one embodiment, the processing device identifies one or more blocks for garbage collection. In one embodiment, the processing device identifies a block for garbage collection when the number of valid data units in the block has reached a garbage collection threshold or is within a predetermined range of the garbage collection threshold. For example, the processing device determines that the number or percentage of valid data units in a block has reached the garbage collection threshold. In such an example, if the stream efficiency value for blocks in a superblock is 0.80 or 80%, the processing system identifies and selects blocks for garbage collection that have 70% invalid data units.

In one embodiment, the processing device identifies multiple blocks for garbage collection if multiple blocks have reach or are within the predetermined range of the garbage collection threshold.

The processing device identifies valid data units in the identified block using a flag or other indicator that indicates that a data unit is valid. The processing device copies the identified valid data units from the identified block to a new block. The processing device copies valid data units to another block within the same superblock and does not copy invalidated data units.

The processing device erases the data from the identified block in response to determining that all valid data units written to the identified block have been copied to the new block. In one embodiment, the processing device adds the newly erased block to a queue of empty blocks for subsequent writes of data units from the stream of data.

B. Performing Garbage Collection of Data Based on Predicted Stream Behavior

In one embodiment, the stream data manager 113 observes the behavior of streams of data to determine characteristics of the streams of data. For example, the stream data manager 113 observes the number of valid and/or invalid data units associated with a stream of data as the number of block stripes filled with data from the stream of data increases. For example, the stream data manager 113 determines the number of valid and/or invalid data units associated with a stream of data at intervals, e.g., after every block stripe fill, every other block stripe fill, etc. In one embodiment, the number of valid data units is normalized as a percentage of the total number of data units written. The stream data manager 113 then generates a function representing the invalidation of the data units of the stream of data. In one embodiment, the generated function is a curve fitting function that produces an exponential curve closely matching the observed data from a stream, where the exponential curve represents the invalidation of data units from the particular stream of data over time.

In other embodiments, the stream data manager 113 determines the number of valid and/or invalid data units associated with a stream of data at two points in time (e.g., two block stripe fills), and calculates a slope representing the rate of invalidity for the stream of data at the given time. For example, the stream data manager determines the slope between two points to determine a rate of invalidity over the period between the two points. By comparing the determined slopes for different streams of data over the same points in time, the stream data manager 113 can distinguish streams of data in which data units are invalidating quickly (e.g., hot streams) from streams of data in which data units are invalidating slowly (e.g., cold streams).

Figure 3:
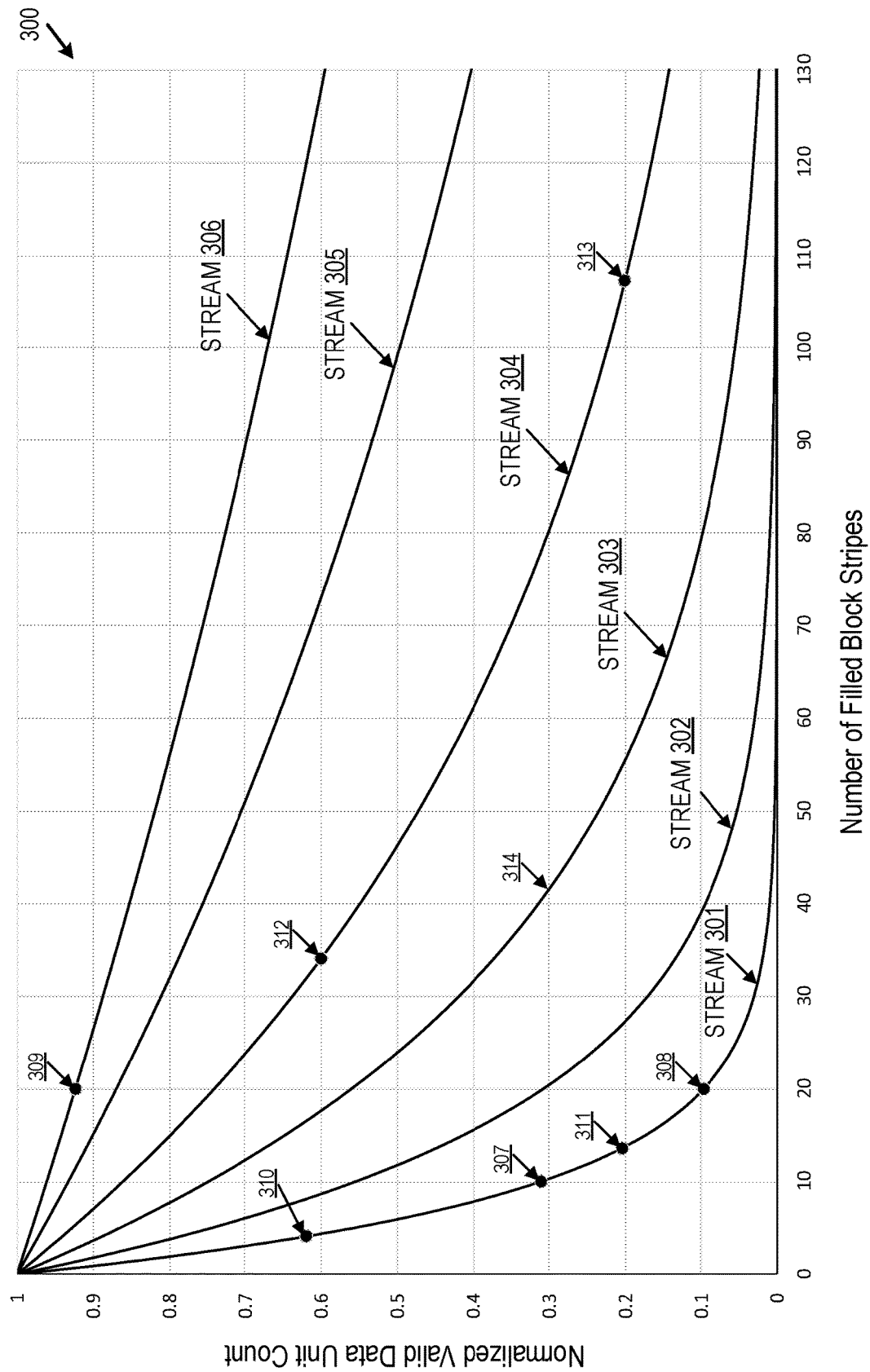
FIG. 3 illustrates a chart of the behaviors of multiple streams of data, in accordance with some embodiments of the present disclosure.

FIG. 3 illustrates a chart 300 of the behaviors of multiple streams of data, in accordance with some embodiments of the present disclosure. In one embodiment, the stream data manager 113 analyzes a stream of data by determining percentages of valid data units of total data units for the stream of data against an amount of block stripes written to that stream of data. In one embodiment, the analysis of a stream of data is performed as the stream data manager 113 writes data units to a block in a superblock associated with the stream of data. For example, the stream data manager 113 maintains a data structure by updating values per stream corresponding to block stripes written and the normalized valid data unit count. In one embodiment, the stream data manager 113 evaluates the behaviors of multiple streams of data at various points in time. In one embodiment, the evaluations of the normalized valid data unit count are performed at times based on the number of filled block stripes within the block. For example, the stream data manager 113 can perform the evaluation after the stream data manager 113 fills one block stripe, two block stripes, five block stripes, etc. In one embodiment, the stream data manager 113 uses the data from the evaluations to generate functions to represent each stream of data. For example, the stream data manager 113 evaluates six example streams of data 301-306 and determines the streams of data can be represented by the following curve-fitting functions:

| Stream | Function |
| --- | --- |
| Stream 301 | $y = e^{-0.117x}$ |
| Stream 302 | $y = e^{-0.059x}$ |
| Stream 303 | $y = e^{-0.029x}$ |
| Stream 304 | $y = e^{-0.015x}$ |
| Stream 305 | $y = e^{-0.007x}$ |
| Stream 306 | $y = e^{-0.004x}$ |

For each of the curve-fitting functions, x is the number of block stripe fills, and y is the normalized valid data unit count. Different streams of data with different observable behaviors will be represented by different curve-fitting functions.

Chart 300 depicts six functions for six different streams of data having different behaviors. In chart 300, the normalized valid data unit count is value between 0 and 1, where a value of 0 indicates 0% valid data units in the block, and a value of 1 indicates 100% valid units in the block. In one embodiment, the stream data manager 113 uses the determined functions to predict how each stream will subsequently behave, assuming there are no changes in the behavior of the streams. In other embodiments, the stream data manager 113 continues to evaluate the behavior of each stream and, if changes in behavior are detected (e.g., a stream invalidates data units at a faster or slower pace), generates modified functions based on any observed changed behavior of the stream.

In chart 300, stream 301 initially has the steepest slope, indicating data units from stream 301 invalidate at a faster rate than other illustrated streams of data. Stream 302 displays a more gradual slope, indicating that the data units from 302 invalidate at a lower rate in comparison to stream 301. Subsequent streams 303-306 display increasingly gradual slopes, indicating increasingly lower initial invalidation rates.

In one embodiment, the stream data manager 113 utilizes the function associated with a stream of data to determine an expected percentage of valid data units when a specified amount of data units have been written to a memory component (e.g., 112A-N). For example, prior to ten blocks stripes being filled by data units from stream 301, entering 10 as the value of x in the function for stream 301, the stream data manager 113 can estimate the blocks associated with stream 301 storing the data units will contain approximately 31% valid data units, with the remaining 69% data units having been invalidated. In FIG. 3, this is depicted by point 307.

In one embodiment, data units in a first stream of data have a higher invalidity rate compared to data units in a second stream of data when the first stream of data has a steeper exponential decline towards a normalized valid data unit count of 0 (e.g., 0% valid data units). For example, using the function for stream 301, when 20 blocks stripes are filled by data units from stream 301 (e.g., x=20), the blocks storing the data units contain approximately 9.6% valid data units, with the remaining 90.4% data units having been invalidated, as depicted by point 308. Similarly, using the function for stream 306, when 20 blocks stripes are filled by data units from stream 306, the blocks storing the data units contain approximately 92.3% valid data units, with the remaining 7.7% data units having been invalidated, as depicted by point 309. In one embodiment, based on the observed behavior of the streams of data, the stream data manager 113 identifies that stream 301 invalidates data units at a faster rate than stream 306.

In one embodiment, the stream data manager 113 determines that the data units in the stream of data invalidate at such a fast rate, that garbage collection is unnecessary because, after an expected number of writes, an entire block will self-invalidate. In that situation, the stream data manager 113 waits until the entire block has self-invalidated and can erase the block without having to copy any valid data to a new block.

In one embodiment, the stream data manager 113 utilizes the evaluated behavior of a stream to determine a threshold for performing a garbage collection process on the blocks associated with the stream. In one embodiment, the stream data manager 113 establishes the garbage collection threshold for each block within a superblock associated with a stream of data. For example, in one embodiment, the stream data manager 113 evaluates the function determined for stream 301 from the evaluated behavior of stream 301. The stream data manager 113 identifies that, when 4 block stripes have been written with data units from stream 301, the normalized valid data unit count is approximately 0.626 or 62.6%, as depicted by point 310, and that, when 13 block stripes have been written with data units from stream 301, the normalized valid data unit count is approximately 0.218 or 21.8%, as depicted by point 311. In this example, stream 301 invalidates quickly, as the number of observed block stripe fills for the normalized valid data unit count to drop from approximately 0.6 to 0.2 is small (e.g., 9 block stripe fills or x going from 4 to 12 block stripe fills). In one embodiment, because the stream data manager 113 determines that stream 301 invalidates quickly, the stream data manager 113 sets a garbage collection threshold for each block in the superblock associated with stream 301 to when the normalized valid data unit count within the block reaches or is within a preestablished range of a value, such as 0.2 or 20%.

In some embodiments, the stream data manager 113 sets garbage collection thresholds by first selecting discrete block stripe fill numbers (e.g., 20, 60, 100, etc.), and estimating the corresponding normalized valid data unit counts for each stream. In such embodiments, the stream data manager 113 treats streams having higher normalized valid data unit counts as being "cold streams" and streams having lower normalized valid data unit counts as being "hot streams." In some embodiments, the garbage collection thresholds can be predetermined values, where the predetermined values are amounts of valid data units within a block. In some embodiments, the stream data manager 113 establishes a different garbage collection threshold for blocks based on how the streams of data associated with blocks are classified. For example, the stream data manager 113 can establish one garbage collection threshold for one set of blocks having lower normalized valid data unit counts as being data units from a "hot stream," and a different garbage collection threshold for one set of blocks having higher normalized valid data unit counts as being data units from a "cold stream." As a "cold stream" has more valid data units, as compared to a "hot stream," the stream data manager establishes a higher value of remaining valid data units for a cold stream threshold and a lower value of remaining valid data units for a hot stream threshold.

The stream data manager 113 uses this information in conjunction with the block cycle count (e.g., the number of times a block has been through a program/erase cycle) to select blocks for garbage collection. In such embodiments, the stream data manager 113 sets garbage collection thresholds based on the identification and the blending of similar chunks from different streams into a block.

In one embodiment, the stream data manager 113 utilizes additional factors in determining a threshold for performing a garbage collection process on blocks associated with a stream. An additional factor used to determine an appropriate garbage collection threshold can include a spare empty block count. For example, if the stream data manager 113 determines that there is a large amount of spare empty blocks, the stream data manager 113 sets the threshold at a lower normalized valid data unit count. Conversely, if the stream data manager 113 determines that there is a small amount of spare empty blocks, the stream data manager 113 sets the threshold at a higher normalized valid data unit count to perform the garbage collection earlier.

In one embodiment, assuming the stream data manager 113 determines a garbage collection threshold of 0.3 for stream 303, the stream data manager 113 uses the function determined for stream 303 (e.g., $y=e^{-0.029x}$) to determine the projected block stripe fills to reach the garbage collection threshold. For example, the stream data manager 113 determines an expected or estimated number block stripe fills of 42 for a block to reach a preestablished range of a normalized valid data unit count of 0.3 (depicted as point 314). In such embodiments, the stream data manager 113 maintains a count of the number of block stripe fills performed and, after the estimated number of block stripe fills are performed, determines whether a valid data unit count of the block is within an established range of or has exceeded the threshold value. When the stream data manager 113 determines that the valid data unit count of the block is within the established range of or has exceeded the threshold value (e.g., 42 block stripe fills), the stream data manager 113 performs, or initiates the performance of garbage collection for the block.

In another example, the stream data manager 113 identifies that when 34 block stripes have been written with data units from stream 304, the normalized valid data unit count is approximately 0.6 or 60%, as depicted by point 312. Based upon the determined function for stream 304, the stream data manager 113 projects that, when 107 block stripes have been written with data units from stream 304, the normalized valid data unit count will be approximately 0.2 or 20%, as depicted by point 313. Because stream 304 invalidates at a slower rate (in comparison to stream 301), a greater number of block stripe fills are required for the normalized valid data unit count to drop from approximately 0.6 to 0.2 (e.g., 73 block stripe fills). Based on this, the stream data manager 113 can establish the garbage collection threshold at a higher valid data unit count within a block associated with stream 304.

By setting different garbage collection thresholds for different streams (e.g., based on their behaviors) the stream data manager 113 more efficiently copies valid data units to other blocks and free up blocks. For example, if the stream data manager 113 applied a uniform garbage collection threshold to all blocks for all streams, the stream data manager 113 would be performing garbage collection more often on blocks for streams that invalidated quickly (e.g., hot streams), and less frequently on blocks for streams that invalidated slowly (e.g., cold streams). In some embodiments, different garbage collection thresholds for different streams also prevents uneven distribution of wear on the media by ensuring that the stream data manager 113 performs garbage collection on both hot streams and cold streams.

In some embodiments, the stream data manager 113 uses the normalized valid data unit count for a stream to calculate a stream efficiency value for a stream of data. For example, the stream data manager 113 calculates a stream efficiency value for a stream of data using the following equation:

Stream Efficiency Value=1−Normalized Valid Data Unit Count

In one embodiment, the stream efficiency value is a numerical value between 0 and 1, where values closer to 0 indicate a lower invalidity count, and values closer to 1 indicate a higher invalidity count. The stream data manager 113 uses the stream efficiency values to determine whether data unit from a stream invalidate quickly (e.g., a hot stream) or invalidate slowly (e.g., a cold stream). For example, if two or more streams of data have written a similar number of data units to blocks, comparing the calculated stream efficiency values indicates which streams of data are invalidating faster. In one embodiment, this equation is an alternative to the stream efficiency value equation described previously.

In one embodiment, the decay rate for the valid data unit count for a stream can be calculated using the following equation, given the number of data units per block stripe and the total number of data units sent by a host for the stream:

$$\text{Exponential Decay Rate for Valid Data Unit Count} = 1 - \frac{\text{Data Units Per Block Stripe}}{\text{Total Data Units in Stream}}$$

In one embodiment, the value of Total Data Units in Stream is the maximum number of total data units for the stream block stripe when the host configured the stream. This equation calculates an estimate of the decay rates for blocks based on data from a single block stripe and the total data units in a stream. In one example, given a value of 120,000 data units per block stripe and 65,640,000 data units in stream 301 (e.g., the total number of data units sent by a host in stream 301), the exponential decay rate for valid data unit count is calculated as 0.998171846. Similarly, given a value of 120,000 data units per block stripe and 2,051,250 data units in stream 306 (e.g., the total number of data units sent by a host in stream 306), the exponential decay rate for valid data unit count is calculated as 0.941499086.

In one embodiment, the stream data manager 113 calculates the number of block stripe fills required to get a free block for a given stream using the exponential decay rate and the following equation:

$$\text{Number of Block Stripe Fills to Get One Free Block} = \ln\left(\frac{\text{Threshold}}{\text{Exponential Decay Rate for Valid Data Unit Count}}\right)$$

In one example, given the exponential decay rate computed for stream 301 above, 0.998171846, the stream data manager 113 estimates performing 1259.51 block stripe fills to get one free block. In another example above, given the exponential decay rate computed for stream 306, 0.941499086, the stream data manager estimates performing 39.36 block stripe fills to get one free block. The stream data manager 113 receives 32-times more data units from stream 301 than from stream 306. Due to the smaller number of data units sent by the host for stream 306, free blocks generate at a faster rate because the exponential decay rate using the above equation is higher. In one embodiment, the stream data manager 113 sets the threshold such that after some number of block stripe fills, a free block is generated. For example, a threshold of approximately 2.7 for stream 301 gives a single free block (e.g., when the value of "natural log of (threshold/exponential decay rate)" equals one).

Figure 4:
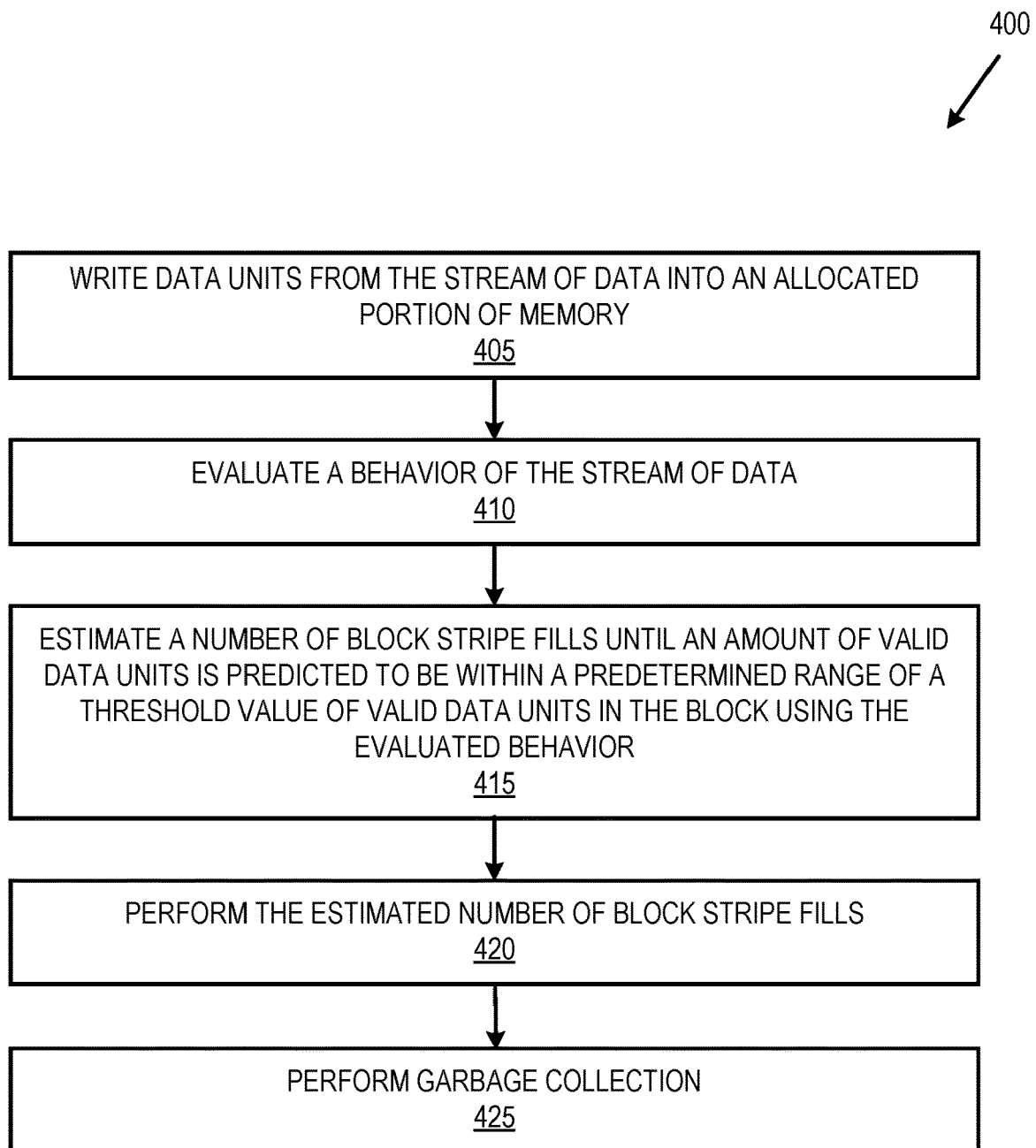
FIG. 4 is a flow diagram of an example method to perform garbage collection on data units within a storage structure, in accordance with some embodiments of the present disclosure

FIG. 4 is a flow diagram 400 of an example method to perform garbage collection on data units within a storage structure, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the stream data manager 113 of FIG. 1 or one or more subcomponents of the stream data manager 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device writes data units from a stream of data into an allocated portion of memory. In one embodiment, the processing device receives the stream of data from a host (e.g., host system 120). For example, the stream of data is composed of data units to be written to a non-volatile memory (e.g., NAND). In one embodiment, the processing device determines or accesses a stream identifier associated with the stream of data. In such embodiments, the stream identifier differentiates data units from different streams and identifies the appropriate superblock (e.g., a set of blocks) for storage of the data units from the received stream of data. In one embodiment, the processing device receives the stream identifier with the data units from host system 120. In another embodiment, the processing device retrieves the stream identifier from a data structure or assigns a stream identifier to the stream of data (e.g., as described above).

At operation 410, the processing device evaluates a behavior of the stream of data. In one embodiment, evaluating the behavior of the stream of data includes determining amounts of valid units from the stream of data in the allocated portion of memory as described above. In one embodiment, the processing device makes the determination at a plurality of intervals, where the intervals are block stripe fills within the allocated portion or memory. For example, the processing device determines the amount of valid data units after each block stripe fill, every other block stripe fill, or at another designated interval.

At operation 415, using the evaluated behavior, the processing device determines an estimated number of block stripe fills until the amount of valid data units for a block within the allocated portion of memory is predicted to be within a predetermined range of a garbage collection threshold value of valid data units in the block.

In one embodiment, the processing device generates a curve fitting function representing the behavior of the stream of data to determine the estimated number of block stripe fills until the amount of valid data units is expected to be within a predetermined range of the determined threshold. In one embodiment, the processing device determines the garbage collection threshold as a number of valid data units in a block within an allocated portion of memory. In one embodiment, the garbage collection threshold is a percentage of valid data units in a block. In one embodiment, the garbage collection threshold is applicable to all blocks within a superblock allocated to a stream of data.

In one embodiment, the processing device generates curve fitting functions (e.g., the functions for streams 301-306, indicated above). In one embodiment, the processing device uses the determined garbage collection threshold of valid data units by inputting the value of the garbage collection threshold into the curve fitting function for the associated stream of data. For example, given the function determined for stream 301 (e.g., $y=e^{-0.117x}$), and a threshold of 0.3 (or 30% valid data units), the processing device calculates an estimated number of block stripe fills until the amount of valid data units is expected to reach the determined threshold as 10.29 block stripe fills. In another example utilizing stream 301, given a garbage collection threshold of 0.30 and a range of 0.02, the processing device determines that the threshold is met when the valid data unit count reaches 0.32 (or 32% valid data units). In this example, the processing device calculates an estimated number of block stripe fills until the amount of valid data units is expected to reach the determined threshold, or in range of the determined threshold, as 9.74 block stripe fills. In one embodiment, the estimated number of block stripe fills is rounded down to an integer value.

At operation 420, the processing device performs the estimated number of block stripe fills after which the valid data unit count for a block is expected to be within range of or exceeds a garbage collection threshold. In one embodiment, the processing device monitors the writing of the data units from the stream of data into the allocated portion of memory, for example, using a counter or another suitable means of tracking the number of block stripe fills.

At operation 425, after performing the estimated number of block stripe fills, the processing device performs garbage collection. In one embodiment, the processing device performs garbage collection on the block by determining the valid data units in a block and re-writing the valid data units to a new block. In one embodiment, after the valid data units are moved to the new block, the processing device erases all the data in the block.

In one embodiment, after performing the estimated number of block strip fills, the processing device determines whether the number of valid data units in a block is within a predetermined range of, has reached, or has exceeded the garbage collection threshold. In one embodiment, the processing device determines the garbage collection threshold as a number of valid data units in a block in a superblock within an allocated portion of memory. In one embodiment, the processing device determines a separate garbage collection threshold for each superblock, based on the evaluated behavior of the specific stream of data associated with the superblock. In one embodiment, the garbage collection threshold is a percentage of valid data units in a block. In embodiments in which the processing device uses a counter to track block stripe fills, when the counter value reaches the estimated number of block stripe fills, the processing device evaluates the blocks associated with the stream of data to determine whether the number of valid data units in a block (e.g., the normalized valid data unit count) is within a predetermined range of, has reached, or has exceeded the garbage collection threshold. When the processing device determines that the number of valid data units within the block is within the predetermined range or has reached/exceeded the garbage collection threshold, the processing device performs garbage collection. When the processing device determines that the number of valid data units within the block is not within the predetermined range of the garbage collection threshold, the processing device continues to receive data units from the stream of data, write the data units into the allocated portion of memory and monitor the performance of block stripe fills. The processing device then determines whether the number of valid data units in a block is within a predetermined range of, has reached, or has exceeded the garbage collection threshold.

Figure 5:
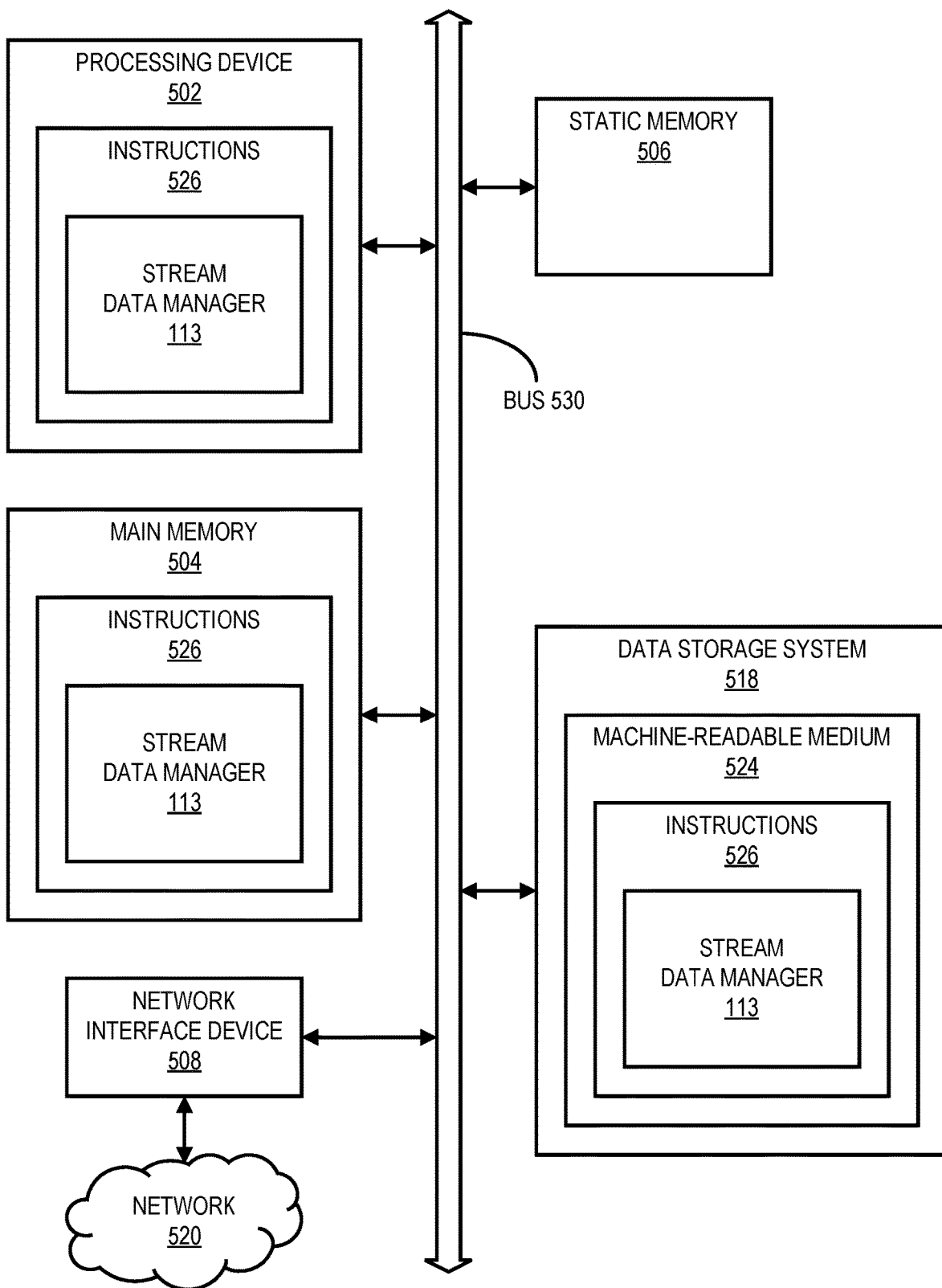
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the stream data manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to a stream data manager (e.g., the stream data manager 113 of FIG. 1).

While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. For example, a computer system or other data processing system, such as the controller 115, may carry out the computer-implemented methods 200 and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
writing data units from a stream of data into an allocated portion of memory, the allocated portion of memory composed of a plurality of blocks;
evaluating a behavior of the stream of data, the behavior including amounts of valid data units from the stream of data in the allocated portion of memory;
estimating a number of block stripe fills until an amount of valid data units is predicted to be within a predetermined range of a threshold value of valid data units in a block using the evaluated behavior;
performing the estimated number of block stripe fills; and
in response to performance of the estimated number of block stripe fills, performing garbage collection of a first block of the plurality of blocks.

2. The method of claim 1, further comprising:
monitoring the writing of the data units from the stream of data into the allocated portion of memory; and
determining that a value of valid data units in the first block is within the predetermined range of the threshold value after the performance of the estimated number of block stripe fills, wherein performing the garbage collection of the first block of the plurality of blocks is further in response to determining that the value of valid data units in the first block is within the predetermined range of the threshold value.

3. The method of claim 1, wherein the threshold value is applicable to each block in the plurality of blocks for determining when to perform garbage collection of each block in the plurality of blocks.

4. The method of claim 1, further comprising:
generating a function representing the evaluated behavior of the stream of data, wherein the generated function is used to determine the estimated number of block stripe fills until the amount of valid data units is within the predetermined range of the threshold value.

5. The method of claim 4, wherein the generated function is a curve fitting function.

6. The method of claim 1, wherein evaluating the behavior of the stream of data comprises:

determining the amounts of valid data units from the stream of data in the allocated portion of memory at an interval.

7. The method of claim 6, wherein the interval is block stripe fills of blocks in the allocated portion of memory.

8. A non-transitory computer-readable medium storing instructions, which when executed by a processing device, cause the processing device to:
 write data units from a stream of data into an allocated portion of memory, the allocated portion of memory composed of a plurality of blocks;
 evaluate a behavior of the stream of data, the behavior including amounts of valid data units from the stream of data in the allocated portion of memory;
 estimate a number of block stripe fills until an amount of valid data units is predicted to be within a predetermined range of a threshold value of valid data units in a block using the evaluated behavior;
 perform the estimated number of block stripe fills; and
 in response to performance of the estimated number of block stripe fills, perform garbage collection of a first block of the plurality of blocks.

9. The non-transitory computer-readable medium of claim 8, wherein the instructions further cause the processing device to:
 monitor the writing of the data units from the stream of data into the allocated portion of memory; and
 determine that a value of valid data units in the first block is within the predetermined range of the threshold value after the performance of the estimated number of block stripe fills, wherein performing the garbage collection of the first block of the plurality of blocks is further in response to determining that the value of valid data units in the first block is within the predetermined range of the threshold value.

10. The non-transitory computer-readable medium of claim 8, wherein the threshold value is applicable to each block in the plurality of blocks for determining when to perform garbage collection of each block in the plurality of blocks.

11. The non-transitory computer-readable medium of claim 8, wherein the instructions further cause the processing device to:
 generate a function representing the evaluated behavior of the stream of data, wherein the generated function is used to determine the estimated number of block stripe fills until the amount of valid data units is within the predetermined range of the threshold value.

12. The non-transitory computer-readable medium of claim 11, wherein the generated function is a curve fitting function.

13. The non-transitory computer-readable medium of claim 8, wherein evaluating the behavior of the stream of data comprises:
 determining the amounts of valid data units from the stream of data in the allocated portion of memory at an interval.

14. The non-transitory computer-readable medium of claim 13, wherein the interval is block stripe fills of blocks in the allocated portion of memory.

15. A system comprising:
 a memory component; and
 a processing device, coupled to the memory component, configured to:
  write data units from a stream of data into an allocated portion of memory, the allocated portion of memory composed of a plurality of blocks;
  evaluate a behavior of the stream of data, the behavior including amounts of valid data units from the stream of data in the allocated portion of memory;
  estimate a number of block stripe fills until an amount of valid data units is predicted to be within a predetermined range of a threshold value of valid data units in a block using the evaluated behavior;
  perform the estimated number of block stripe fills; and
  in response to performance of the estimated number of block stripe fills, perform garbage collection of a first block of the plurality of blocks.

16. The system of claim 15, wherein processing device is further configured to:
 monitor the writing of the data units from the stream of data into the allocated portion of memory; and
 determine that a value of valid data units in the first block is within the predetermined range of the threshold value after the performance of the estimated number of block stripe fills, wherein performing the garbage collection of the first block of the plurality of blocks is further in response to determining that the value of valid data units in the first block is within the predetermined range of the threshold value.

17. The system of claim 15, wherein the threshold value is applicable to each block in the plurality of blocks for determining when to perform garbage collection of each block in the plurality of blocks.

18. The system of claim 15, wherein processing device is further configured to:
 generate a function representing the evaluated behavior of the stream of data, wherein the generated function is used to determine the estimated number of block stripe fills until the amount of valid data units is within the predetermined range of the threshold value.

19. The system of claim 15, wherein evaluating the behavior of the stream of data comprises:
 determining the amounts of valid data units from the stream of data in the allocated portion of memory at an interval.

20. The system of claim 19, wherein the interval is block stripe fills of blocks in the allocated portion of memory.

* * * * *